(12) United States Patent
Müller

(10) Patent No.: US 6,598,939 B2
(45) Date of Patent: Jul. 29, 2003

(54) WHEEL

(76) Inventor: Gerd Müller, Ringstrasse 4, 66459 Limbach (DE)

(*) Notice: Subject to any disclaimer, the term of this patent is extended or adjusted under 35 U.S.C. 154(b) by 0 days.

(21) Appl. No.: 09/779,244

(22) Filed: Feb. 8, 2001

(65) Prior Publication Data

US 2002/0017818 A1 Feb. 14, 2002

(30) Foreign Application Priority Data

Aug. 8, 2000 (DE) .......................... 400 07 618
Aug. 14, 2000 (DE) ...................... 200 13 993 U

(51) Int. Cl.⁷ ................................. B60B 25/00
(52) U.S. Cl. ......................... 301/11.1; 301/10.1
(58) Field of Search ................. 301/9.1, 10.1, 301/11.1, 11.3, 12.1, 63.106, 64.301, 65, 95.101, 95.11

(56) References Cited

U.S. PATENT DOCUMENTS 1,791,596 A * 2/1931 Kenslow
2,229,724 A * 1/1941 Burger et al.
3,186,767 A * 6/1965 Walther
4,008,923 A * 2/1977 Walther et al. ............ 301/12.1
4,679,860 A * 7/1987 Koishi et al.
4,982,998 A * 1/1991 Mikawa
4,997,235 A * 3/1991 Braungart .................. 301/11.1
5,104,197 A * 4/1992 Lipper
5,275,471 A * 1/1994 Nutzmann
5,435,629 A * 7/1995 Suzuki

* cited by examiner

Primary Examiner—Russell D. Stormer
(74) Attorney, Agent, or Firm—Young & Basile, PC

(57) ABSTRACT

Wheel, in particular, for a motor vehicle with a rim and a spider, where a bolted connection is provided in the area of transition from the rim to the spider, in which a bolt head or a nut on the outside acts in conjunction with a contact surface on the spider, where the bolted connection includes a spacer sleeve which, with one of its sides, acts in conjunction with the bolt head or the nut and, with its other side, with the contact surface in such a way that the bolt head or the nut projects above the outer surface of the spider.

12 Claims, 2 Drawing Sheets

WHEEL

BACKGROUND

The invention relates to a wheel, in particular for a motor vehicle, with a rim and a spider, where a bolted connection is provided in the area of the transition from the rim to the spider, in which a bolt head or a nut on the outside acts in combination with a contact surface on the spider.

Inside and outside here are understood to mean the sides of the wheel which they assume in the installed position on the vehicle.

Bolted connections of this type are frequently provided in the case of wheels for automobiles. For example, in the case of two-piece wheels, the rim and the spider are bolted together. In the case of three-piece wheels, the rim itself is in two parts, and both parts are attached to the spider with a single bolted connection.

In addition, even in the case of single-piece wheels, a bolted connection is frequently provided which does not fulfil any functional purpose, but which lends the wheel the stylish look of a more expensive, multi-piece wheel.

For example, a three-piece wheel is known from U.S. Pat. No. 4,770,220 in which the three parts of the wheel are connected by a bolt.

Furthermore, U.S. Pat. No. 5,343,920 describes a bolted connection for a multi-piece wheel, where a threaded bolt is first pressed into the wheel and the bolted connection is then made by means of a nut which is integrally joined to a flange and an extension piece.

Furthermore, a bolted connection for a three-piece wheel is known from DE-OS 23 61 066.

All these wheels have a spider formed as a plane surface, at least in the area of the bolted connection, where the outer edge of the spider, that is the area of the bolted connection, forms a surface perpendicular to the axis of the wheel.

Milling a cutout into the spider is also known, so that a bolt head or a nut in the tightened position is recessed with respect to the wheel surface. The disadvantage to this is that these parts of the wheel are particularly prone to becoming dirty because of the recessed contact surface, and the result is an unattractive visual effect from the wheel, which frequently serves as a focal design point on the vehicle, particularly, as in the case of bolted connections using a hexagon head or a 12-point head for the bolt or the nut, the cavities in the spider have to be selected considerably larger than the bolt head or the nut, in order to provide adequate access for the tool. In these cases, the area in particular between the bolt head (nut) and the base of the spider becomes dirty.

In as much as provision is made for a hexagon socket head, the cavity can be essentially selected exactly the same size as the bolt head, or the nut; the result is still an unattractive build-up of dirt in the area of the hexagon socket head, and besides that, hexagon socket head bolts have an awkward look, such as is often not desirable on expensive styled wheels.

This problem has since been partly solved by integrally casting in shoulders in the area of the bolted connection, which have a surface running perpendicular to the longitudinal axis of the wheel.

The integral forming of the shoulders at the time of the casting process for the spider represents considerable trouble and expense from the manufacturing standpoint. Beyond that, these shoulders give the wheel a crude appearance because of their size, since they have to be carried over into the spider using gradual transitions.

SUMMARY

The object of the invention is, therefore, to provide a wheel with a bolted connection in the area between the rim and the spider, in which first of all dirt is prevented from collecting in the area of the bolted connection as far as possible, and in addition, the simplest possible production is ensured together with appealing visual qualities. At the same time, the wheel designer should have the greatest possible latitude at his disposal for the wheel design.

The object is achieved according to the invention in that the bolted connection comprises a spacer sleeve, which with one side acts in conjunction with the bolt head or the nut, and with the other side, with the contact surface (abuts against it) in such a way that the bolt head or the nut projects above the outer surface of the spider.

By using a spacer sleeve between the contact surface and the underside of the bolt head or the nut, the distance between the nut (bolt head) and the contact surface can be increased far enough so that the bolt head no longer lies directly on the contact surface. By having the bolt head or the nut project above the surface of the spider, tools can gain access to the bolt head (nut) with exceptional ease, in particular, since the bolt head is not in direct contact with the surface of the spider. Scratching the surface when loosening or tightening the bolt is thus avoided. In addition, the automobile is given a new unique styling look.

The invention is particularly advantageous in the case of curved or angled spiders or whose surfaces, at least in the area of the bolted connection, i.e., essentially in the area of the outer periphery of the spider, are curved or run at an angle. In the case of wheels on which the forward edge of the spider in cross section is curved in the area of the bolted connection, or runs at an angle to the perpendicular to the wheel rim axis, that is to say, it forms a cone, the problem always arises that a flat contact surface running perpendicular to the wheel axis has to be created for the bolted connection. By providing a spacer sleeve, the contact surface can be created in the spider surface by simple milling. At the same time, bolts which are easier to clean and have a visually more appealing outer contour can be used, where the contact surface can be formed in such a way that only a narrow gap remains between the spacer sleeve and the spider in the area of the spacer sleeve jacket, so that essentially no dirt collects in hard-to-clean areas.

Furthermore, as a result it is no longer necessary to cast integral shoulders on the spider in order to create a contact surface which simultaneously allows access to the bolt or nut with a tool.

In accordance with a first embodiment it can be provided that in cross section the outer edge of the spider is set back in the direction of the inside of the wheel in the area of the bolted connection, with respect to the area of the wheel axis of the spider. Inside of the wheel and outside of the wheel means here the side when it is in its operating position, i.e. facing towards the vehicle and facing away from the vehicle. As a result, a particularly pleasing wheel exterior is achieved. The spider then has an essentially conical form, where the lateral face of the cone can be straight or curved. However, a "funnel shape" for the outer surface is also conceivable, i.e., a concave shape for the spider when viewed from the outer side.

In particular, it can also be provided that the spacer sleeve is an integral part of the bolted connection. That is to say, the bolted connection, or a part of the bolted connection, for example, the bolt or a nut, and the spacer sleeve can be joined to form a single part, where the result is a uniquely configured shape for the bolt head or the nut, which creates an especially attractive stylish appearance.

The spacer sleeve can have both a circular as well as a polygonal cross section, for example, rectangular or hexagonal where the cross section is perpendicular to the longitudinal axis.

Furthermore, it can be provided that the bolt head or the nut has a non-cylindrical outer contour, in particular a hexagonal or 12-point shape on its outer periphery or else an internal contour, in particular a hexagonal socket shape. Other shapes are possible for the nuts or the bolt heads.

The invention relates in addition to a wheel with a rim and a spider, in particular for a motor vehicle, where a bolted connection is provided in the area of the transition from the rim to the spider, in which a bolt head or a nut abuts on the outside against a contact surface on the spider, where the bolted connection comprises a spacer sleeve integrally attached to the bolt head or the nut, which with one of its sides acts in conjunction with the bolt head or the nut and with its other side with the contact surface in such a way that the bolt head or the nut projects above the outer surface of the spider and where the bolt head or the nut and the spacer sleeve do not have any external or internal flats and the bolted connection includes an anti-rotation element for tightening the bolted connection.

An embodiment of this kind for the nut or the bolt head, without any external or internal flats whatever, where the bolt head can be essentially formed as a cylinder, firstly gives special emphasis to the appearance, secondly the build-up of dirt can be further reduced. Finally, a design of this kind offers the advantage that with the wheel mounted to the vehicle no surfaces are provided from the outside to gain a purchase and loosen the bolted connection. Further theft protection is thereby achieved. Finally the design is particularly attractive because the spacer sleeve and bolt head or nut appear to be cast in one piece.

In order to ensure that the bolted connection is tightened, without having to apply counterpressure at the bolt head or the nut or the spacer sleeve which have no external or internal flats, the bolted connection has an anti-rotation element. This anti-rotation element must be designed so that it can withstand normal tightening torque. It is located on the side of the bolted connection which also includes the spacer sleeve.

It can be provided here that bolt head or nut and spacer sleeve are realized as cylindrical sections with different diameters, or that the part of the bolted connection visible on the outside can have different rotationally symmetrical form without flats, as for example, a smaller cylinder on top of a larger cylinder, however a conically tapering form can also be provided. The bolt head (nut) and/or the spacer sleeve can, for example, be tapered in addition, where the transition in the case of all shapes can be formed with or without a step. The transitions can be rounded.

The bolted connection can be formed in different ways. It can be provided that the bolted connection consists of a threaded rod and two nuts. However, it can also be provided that one of the nuts is connected in one piece to the threaded rod as a bolt head and forms a bolt. The threaded rod can be threaded over its entire length, but also only in sections.

A drilled passage, which can be furnished with or without a thread, can be provided for the bolted connection, where a bolted connection is made on the inside of the wheel by means of an additional nut, or else a bolt can be pushed through from the inside to the outside or inserted from the outside to the inside through the wheel rim.

Alternatively the bolted connection can also be formed solely by means of a threaded rod with an integrally attached bolt head, where the bolted connection is made in a threaded blind hole in the spider or the rim. The bolted connection without flats is not feasible for this type of threaded connection, since it would not be possible to tighten the bolted connection if a nut or bolt head without flats were provided.

A surface with knurling or a coefficient of friction increased in another way can be provided as the anti-rotational element. In particular, it can be provided that the spacer sleeve has a surface with an increased coefficient of friction at least in sections.

In particular it can be provided that the contact surface for the bolted connection is recessed with respect to the outer surface of the spider. A certain recess will always be necessary, at least in those cases in which the spider has a curved or angled outer surface, in order to ensure a level contact surface for the spacer sleeve and thereby the bolt or nut. The recess can be formed to different depths, where the distance by which the bolt extends above the surface of the spider can be determined through the height of the spacer sleeve.

It is particularly advantageous if the contact surface and thus the recess provided in the spider to seat the bolted connection essentially matches the dimensions of the spacer sleeve. This ensures that no surfaces are created at the base of the recess which are difficult to reach with cleaners.

The wheel can be formed in two or three parts, and the bolted connection can also represent a purely decorative item in the case of a one-piece wheel. A blind hole into which a thread has been cut matching the bolt thread can be provided in the rim for the bolted connection.

BRIEF DESCRIPTION OF THE DRAWINGS

The invention is explained in greater detail below using the drawing in which.

DETAILED DESCRIPTION

Figure 1:
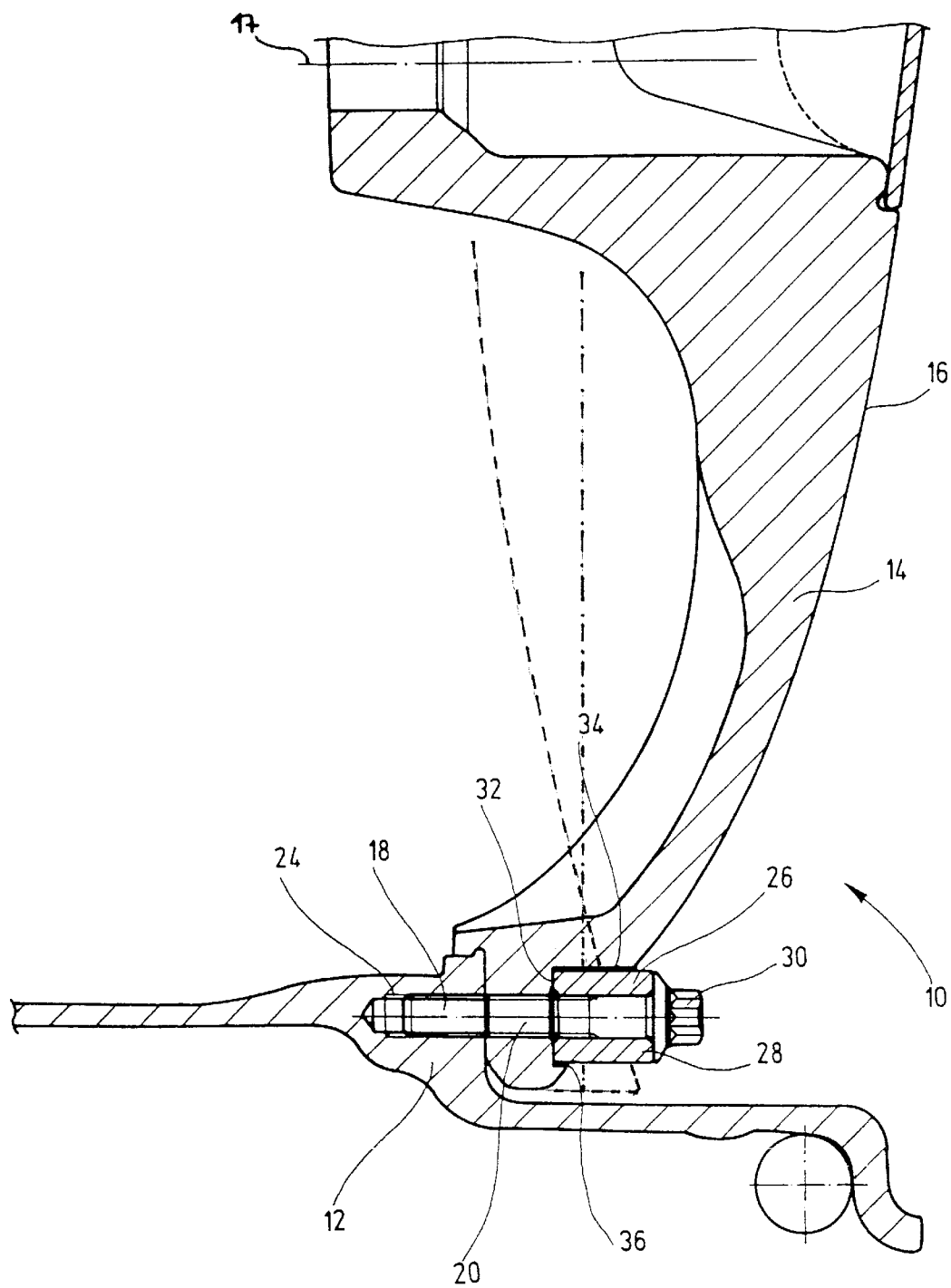
FIG. 1 shows a first wheel partially in section.

FIG. 1 shows a two-part wheel, which is identified in its totality as 10. The wheel consists of a rim 12 and a spider 14, which has a surface 16 curved towards the outside. The curvature of the surface 16 increases from the longitudinal wheel axis 17, the center of the wheel, towards the bolted connection 18, the edge of the spider 14. Both parts of the wheel 14 and 12 are attached to one another by means of a threaded connection 18. The threaded connection 18 is made up of a bolt 20, which is screwed into a thread in the spider 14 and in the rim 12. A blind drilled hole 24 is provided for this in the rim 12. The spider 14 has a drilled passage.

Located concentrically around the bolt 20 is a spacer sleeve 26, which with one of its sides abuts against the bolt head 30, which has an external non-cylindrical contour, and with its other side 28 against a contact surface 32 of the spider 14 which is recessed with respect to the surface 16 of the spider 14. A contact surface 32 is thereby provided, running perpendicular to the longitudinal axis of the wheel 17. The bolt head 30 and a part of the spacer sleeve 26 project above the surface 16 of the spider. The bolt head 30 in this case has an especially attractive external 12-point form.

The accessibility of the bolt head 30 is improved as a result of this design, and only a small gap 34 between the spacer sleeve 26 and the recess 36 in the spider 14 is necessary, so that no corners or angles are created in which dirt can accumulate. At the same time, it is very simple to apply a tool to the bolt head 30.

The dotted line and the dot-dash line in each case show an additional possible continuation of the surface 16 of the spider 14.

Figure 2:
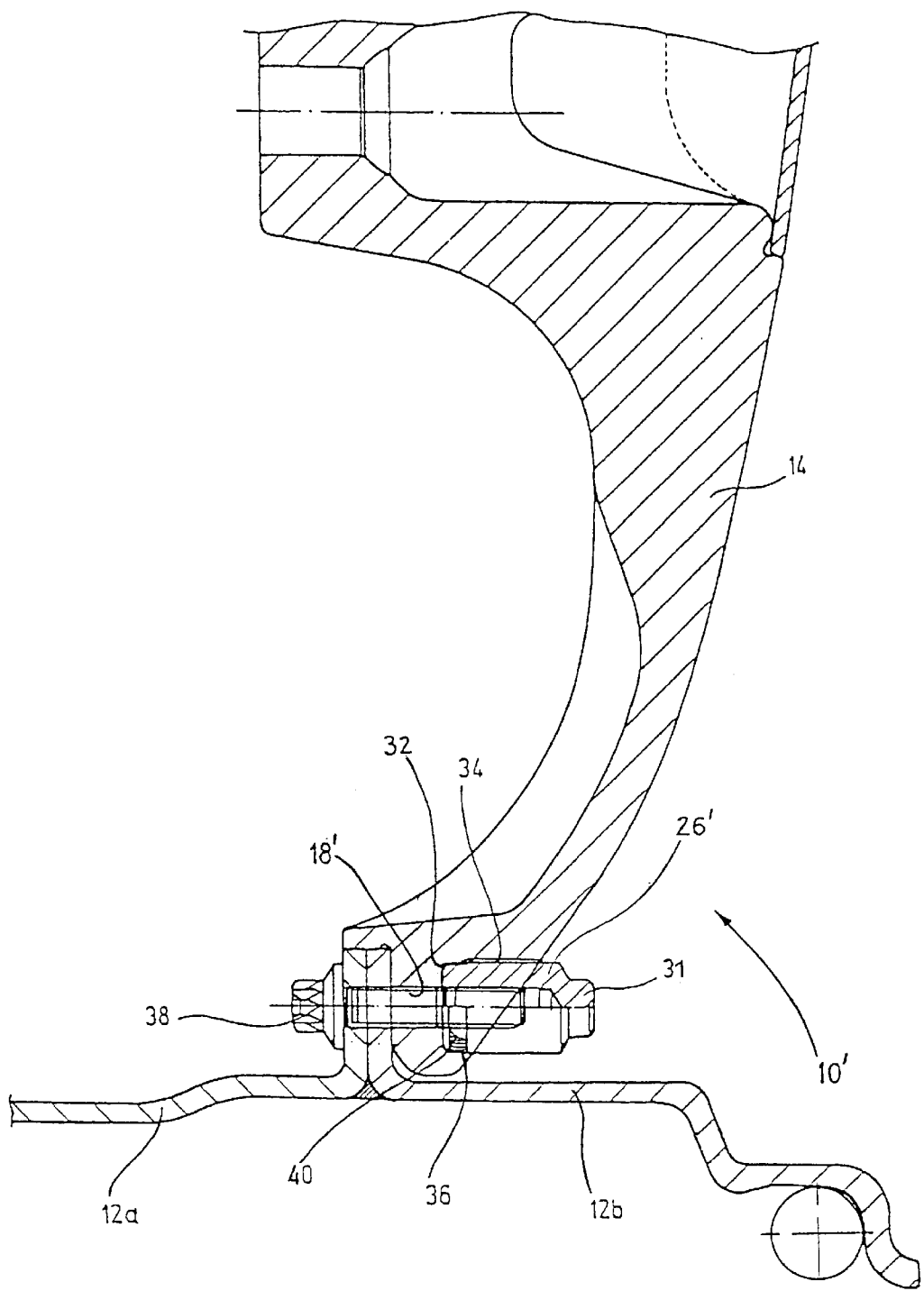
FIG. 2 shows a second wheel partially in section.

FIG. 2 shows an alternative embodiment of a wheel 10' according to the present invention. The wheel 10' here is constructed in three pieces and consists of a spider 14 and a two-piece rim 12a and 12b. The three parts are joined to one another by means of a bolted connection 18'. A drilled passage extends through all three parts, where a recess 36 is provided in the area of the outer surface 16 of the spider 14, to seat the nut 31. Here too the surface 16 of the spider 14 is curved, where the curvature runs in the direction of the inside of the wheel rim 12a, 12b. The bottom of the recess 36 forms the contact surface 32 for the spacer sleeve 26'. The bolted connection 18 is secured by a second nut 38. The nut 38 is located on the inside of the wheel 10'.

The spacer sleeve 26' is an integral part of the nut 31, i.e., it is attached to the nut 31 as one piece. The nut 31 blends smoothly into the spacer sleeve 26'. The nut 31 and the spacer sleeve 26' have no external or internal flats. They consist in each case of a cylindrical body, where the two cylindrical bodies have different diameters and are attached to each other in such a way that the two center axes are identical. The transition is given an attractive rounded shape.

The embodiment without flats is particularly advantageous since no opportunity exists for obtaining any purchase with a wrench, for example, from the outside of the wheel rim. Since it is not possible to apply counter-pressure when tightening the bolted connection 18 at the nut 31 or the spacer sleeve 26', the spacer sleeve 26' has a surface 40 with an increased coefficient of friction, which secures the bolted connection 18' against turning in the same direction when it is being tightened. At an assumed torque of 15 Nm, a plastic surface, for example, is sufficient or else, in particular, knurling is used on the spacer sleeve material, in particular aluminum or an alloy thereof.

The gap between the spacer sleeve 26' and the recess 36 is in turn so small that no dirt-trapping angles are formed, and the wheel rim surface 16 is easy to clean.

The modular construction of the wheel 10 and 10' has the advantage that the rim 12, using the same spider 14, can easily be made wider or narrower.

What is claimed is:

1. A wheel with a rim and a spider having a contact surface and an outer surface, wherein in an area of the transition from the rim to the spider a bolted connection is provided, in which one of a bolt head and a nut on an outside of the wheel act in conjunction with the contact surface of the spider, where the bolted connection comprises a spacer sleeve having a first end that acts in conjunction with the one of the bolt head and the nut and second end that acts in conjunction with the contact surface such that the one of the bolt head and the nut projects above the outer surface of the spider.

2. The wheel in accordance with claim 1, wherein the contact surface of the spider is perpendicular on the wheel axis.

3. The wheel in accordance with claim 2, wherein the contact surface of the spider is set back in the direction of an inside of the wheel in the area of the bolted connection, with respect to the outer surface of the spider.

4. The wheel in accordance with claim 1, wherein the spacer sleeve is integral with the one of the bolt head and the nut.

5. The wheel in accordance with claim 1, wherein the one of the bolt head and the nut and the spacer sleeve has one of an external polygonal contour, and an internal polygonal contour.

6. The wheel in accordance with claim 1, wherein the bolted connection includes a spacer sleeve integral with the one of the bolt head and the nut, and wherein the one of the bolt head and the nut and the spacer sleeve have no external and internal flats, and the bolted connection further comprising an anti-rotation element.

7. The wheel in accordance with claim 6, wherein the bolted connection further comprises:
    a bolt with a bolt head and a threaded rod connected to the bolt head as one piece; and
    a nut, the bolt extending from an inside of the wheel to the outside of the wheel.

8. The wheel in accordance with claim 6 wherein the bolted connection comprises a threaded rod and two nuts.

9. The wheel in accordance with claim 6, wherein a surface with an increased coefficient of resistance is provided as the anti-rotation element.

10. The wheel in accordance with claim 6, wherein the spider has a recess with a contact surface for the bolted connection, where the contact surface is set back with respect to the outer surface of the spider in the direction of an inside of the wheel.

11. The wheel in accordance with claim 10, wherein the recess essentially matches the dimensions of the cross section of the spacer sleeve.

12. The wheel in accordance with claim 6, wherein the wheel is one of a two-piece and a three-piece wheel.

* * * * *

UNITED STATES PATENT AND TRADEMARK OFFICE
CERTIFICATE OF CORRECTION

PATENT NO.    : 6,598,939 B2
DATED         : July 29, 2003
INVENTOR(S)   : Gerd Mueller It is certified that error appears in the above-identified patent and that said Letters Patent is hereby corrected as shown below:

<u>Column 6,</u>
Line 6, should read:
-- of the bolt head and the nut and a second end that acts in --

Signed and Sealed this

Fourth Day of November, 2003

JAMES E. ROGAN
*Director of the United States Patent and Trademark Office*